UNITED STATES PATENT OFFICE

PAUL KLEIN, OF BUDAPEST, HUNGARY; ANDREW SZEGVÁRI, OF AKRON, OHIO; AND ROBERT FERRIER McKAY, CECIL HAYES, AND GEOFFREY WILLIAM TROBRIDGE, OF BIRMINGHAM, ENGLAND, ASSIGNORS TO AMERICAN ANODE, INC., OF AKRON, OHIO

DIRECT PRODUCTION OF RUBBER ARTICLES FROM AQUEOUS DISPERSION OF RUBBER

No Drawing. Application filed March 22, 1928, Serial No. 263,954, and in Great Britain March 26, 1927.

It has been already proposed to deposit rubber-like substances from their aqueous dispersions by electrophoresis in order to obtain goods in the shape determined by the depositing stratum. As in such cases the product is not raw rubber, whose properties can be altered according to the different requirements during the subsequent manipulations, but more or less ready shaped goods, it is essential, that the electrophoretic deposit should have directly the required qualities. Hence it is important to find means which render it possible to influence the quality of the deposit to be formed on the stratum. The rubber-like substances to be worked according to this invention are rubber, guttapercha and balata as natural latices, which if desired, may be concentrated and/or vulcanized, or artificial aqueous dispersions prepared from the said substances or from waste rubber or reclaimed rubber. These dispersions may be, if desired, combined or mixed with additional substances as for example fillers, dyes, vulcanizing substances, accelerators etc.

We have found that the quality of the deposit varies according to the nature of the dispersion used. Thus for instance deposits obtained from certain dispersions may show during drying a liability to form cracks. Deposits obtained from other dispersions may be in their wet state either too soft or too hard. In another case the deposits may contain too much moisture for certain purposes or too little moisture for other purposes etc.

Our investigations have shown that it is possible to influence the quality of the electrophoretic deposits by altering the quantity or quality of the electrolytes practically free from hydroxyl ions contained in the dispersion; that is, by modifying the proportion of neutral electrolytes and thereby changing the electrical conductivity of the dispersion without substantially affecting its alkalinity.

It is possible to alter the quantity of the neutral electrolytes contained in the dispersion medium either by decreasing their amount, for example by means of dialysis, or by increasing their amount by adding more of such electrolytes. In this latter case the electrolytes added may be other ones than those contained primarily in the dispersion.

The electrolytes contained primarily in the dispersion may be also removed and other electrolytes substituted therefor, the total quantity of the electrolytes contained in the dispersion being thereby either altered or not according to the requirements.

As the ions entering the solution from the anode play a part in the coagulation of the rubber, the anions formed by the electrolytes dissolved in the dispersion are not without effect on the quality of the rubber deposit.

Under certain circumstances the quality of the deposit can be influenced by controlling the quantity of electrolytes dissolved in the dispersion in order to alter the electric conductivity of the dispersion.

In the following several practical examples of the methods according to this invention are given.

If for example the deposits in the moist state show a tendency to form cracks, an addition of a suitable electrolyte to the dispersion usually remedies this disadvantage.

Again when employing a metal anode, it is sometimes found on stripping the deposit off the mould, that rubber particles stick on the anode so that the deposit becomes damaged and the anode has to be thoroughly cleaned before it can be used again. This drawback can be prevented by adding to the dispersion an electrode whose anions form with the substance of the anode water-soluble compounds. Thus for instance with a zinc anode an alkali chloride such as sodium chloride, or an alkali acetate may be added if the above phenomenon arises. Thus for example a dispersion mix containing rubber and filling materials and having a total dry solid content amounting to 25%, a total alkalinity of 0.09 normal and a specific electrical conductivity of $K_{18}=0.00410$ with a current density of 1.2 amp. dm$^2$ yielded deposits sticking more or less to the zinc anode. After 0.35 grams of sodium chloride per litre had been added and the conductivity increased to $K_{18}=0.00433$, the deposits no longer stuck to the anode.

If the anode consists of an alloy, it is sufficient for the anions of the electrolyte to have a dissolving action only on one of the constituent metals of the anode, such as zinc when anodes of amalgamated zinc are used and sodium chloride is added as electrolyte.

An addition of alkali chlorides has a softening effect on the deposit hence such an addition may be used if it is desired to ensure the softness of the deposit.

If an electrolyte with polyvalent cations, as for instance, a salt of an alkaline earth metal, such as calcium chloride, is used for increasing the conductivity, the cohesion of the deposit will be increased, probably due to a labilizing action of these electrolytes on the rubber dispersion.

If the toughness of the deposit must be increased electrolytes having polyvalent anions such as alkali ferrocyanide or alkali phosphate may be added.

In order to obtain homogenous deposits directly on metal anodes, the anode must consist of a metal which dissolves under the electrolytic action of the current. Under given circumstances the quantity of the metallic ions going into solution might be too great causing thereby a coagulation of the rubber at the outer surface of the deposit before the particles could be agglomerated by the electrophoretic pressure to the required density. In such cases the density of the deposit would be insufficient and the deposit would not be tough enough but would be crumbly and show the tendency to form deep cracks if submitted to even small tensile stresses.

This disadvantage can be prevented by adding to the dispersion electrolytes whose anions form insoluble compounds with the metal of the anode. By using zinc anodes the above mentioned alkali ferrocyanide and alkali phosphate are particularly useful for this latter purpose.

For example: A dispersion consisting of rubber and filling substances having a total content of dry substances of 25%, an alkalinity of 0.09 normal and a specific electric conductivity of $K_{18} = 0.00390$ yielded on a zinc anode with a current density of 1.2 amp. $dm^2$ a cataphoretic deposit the outer surface of which was highly crumbly. After adding to the dispersion 1 gr. of disodium phosphate per litre, without exception tough and suitable deposits were obtained.

In obtaining electrophoretic deposits from aqueous dispersions of rubber-like substances it is necessary to stabilize the dispersions by adding a suitable alkali, for instance, ammonia, this latter being generally used for the preservation of natural latex or artificial rubber dispersions. These preservatives are usually added in such quantities that the OH-ion concentration is very high. Hence the electrolytic action of the electric current liberates oxygen on the anode which causes an inhomogeneity of the deposit if this latter is formed immediately on the metal anode. In order to remedy this disadvantage it has been proposed to decrease the concentration of OH-ions until the development of gas at the anode ceases. The concentrations of OH-ions should, however, not be decreased too far, else for example the water content of the deposit would increase to an undesirable degree. In using zinc anodes the upper limit which must not be exceeded but must be approached as closely as possible is generally a total alkalinity of 0.09 normal.

We have ascertained that if the electric conductivity of the dispersion is increased with an electrolyte practically free from hydroxyl ions it is possible to increase at the same time the concentration of the basic electrolyte such as ammonia above the limit which under other circumstances would lead to a gas formation at the anode. By these means the water content of the deposit can be decreased.

According to the invention, therefore, after the conductivity is raised by the addition of an electrolyte free from hydroxyl ions, the alkalinity of the bath is so regulated that it exceeds the alkalinity limit at which anodic gas formation would have taken place before the addition of the electrolyte but is lower than the alkalinity limit at which anodic gas formation takes place after the addition of the electrolyte.

Values for the conductivity of a rubber latex or of a latex mix containing 30% rubber may lie between $K_{18} = 0.001$ and $K_{18} = 0.025$ while the alkalinity may be between 0.01 and 0.4 normal.

Having now particularly described and ascertained the nature of our said invention and in what manner the same is to be performed, we declare that what we claim is:—

1. A process for improving the properties of deposits obtained by electrophoresis of aqueous dispersions of rubber-like substances, which comprises adding to the dispersion an alkali ferrocyanide, and adjusting the alkalinity to a value short of that at which anodic gas formation takes place or at which the deposit becomes excessively compact.

2. A process for obtaining rubber deposits on metallic anodes which comprises adding to an aqueous rubber dispersion a neutral salt which gives rise to an anion having a valency of at least 3 and capable of forming insoluble compounds with the metal of the anode, and electrodepositing the rubber on the said metallic anode.

3. A process for obtaining rubber deposits on metallic anodes which comprises adding to an aqueous rubber dispersion a neutral salt which gives rise to an anion having a valency of at least 3 and capable of forming an insoluble compound with zinc, and electrodepositing the rubber on a zinc anode.

4. A process for obtaining rubber deposits on metallic anodes which comprises adding to an alkaline aqueous rubber dispersion an alkali ferocyanide, and electrodepositing the rubber on a zinc anode.

In testimony whereof we affix our signatures.

PAUL KLEIN.
ANDREW SZEGVÁRI.
ROBERT FERRIER McKAY.
CECIL HAYES.
GEOFFREY WILLIAM TROBRIDGE.

CERTIFICATE OF CORRECTION.

Patent No. 1,878,151.    September 20, 1932.

PAUL KLEIN, ET AL.

It is hereby certified that error appears in the printed specification of the above numbered patent requiring correction as follows: Page 1, line 84, for "electrode" read "electrolyte"; page 2, line 72, for "concentrations" read "concentration"; and that the said Letters Patent should be read with these corrections therein that the same may conform to the record of the case in the Patent Office.

Signed and sealed this 16th day of May, A. D. 1933.

M. J. Moore.
Acting Commissioner of Patents.

(Seal)

soluble compound with zinc, and electrodepositing the rubber on a zinc anode.

4. A process for obtaining rubber deposits on metallic anodes which comprises adding to an alkaline aqueous rubber dispersion an alkali ferocyanide, and electrodepositing the rubber on a zinc anode.

In testimony whereof we affix our signatures.

PAUL KLEIN.
ANDREW SZEGVÁRI.
ROBERT FERRIER McKAY.
CECIL HAYES.
GEOFFREY WILLIAM TROBRIDGE.

CERTIFICATE OF CORRECTION.

Patent No. 1,878,151.    September 20, 1932.

PAUL KLEIN, ET AL.

It is hereby certified that error appears in the printed specification of the above numbered patent requiring correction as follows: Page 1, line 84, for "electrode" read "electrolyte"; page 2, line 72, for "concentrations" read "concentration"; and that the said Letters Patent should be read with these corrections therein that the same may conform to the record of the case in the Patent Office.

Signed and sealed this 16th day of May, A. D. 1933.

M. J. Moore.
Acting Commissioner of Patents.

(Seal)

CERTIFICATE OF CORRECTION.

Patent No. 1,878,151.                                         September 20, 1932.

PAUL KLEIN, ET AL.

It is hereby certified that error appears in the printed specification of the above numbered patent requiring correction as follows: Page 1, line 84, for "electrode" read "electrolyte"; page 2, line 72, for "concentrations" read "concentration"; and that the said Letters Patent should be read with these corrections therein that the same may conform to the record of the case in the Patent Office.

Signed and sealed this 16th day of May, A. D. 1933.

M. J. Moore.
Acting Commissioner of Patents.

(Seal)